(12) United States Patent
Bultje et al.

(10) Patent No.: US 10,148,948 B1
(45) Date of Patent: Dec. 4, 2018

(54) SELECTION OF TRANSFORM SIZE IN VIDEO CODING

(71) Applicant: GOOGLE INC., Mountain View, CA (US)

(72) Inventors: Ronald Sebastiaan Bultje, San Jose, CA (US); Daniel Kang, Cambridge, MA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/198,480

(22) Filed: Jun. 30, 2016

Related U.S. Application Data

(60) Continuation of application No. 14/976,438, filed on Dec. 21, 2015, which is a division of application No. 13/743,602, filed on Jan. 17, 2013, now Pat. No. 9,219,915.

(51) Int. Cl.

| | |
|---|---|
| *H04N 11/02* | (2006.01) |
| *H04N 19/103* | (2014.01) |
| *H04N 19/61* | (2014.01) |
| *H04N 19/44* | (2014.01) |
| *H04N 19/147* | (2014.01) |
| *H04N 19/176* | (2014.01) |
| *H04N 19/122* | (2014.01) |

(52) U.S. Cl.
CPC ......... *H04N 19/103* (2014.11); *H04N 19/122* (2014.11); *H04N 19/147* (2014.11); *H04N 19/176* (2014.11); *H04N 19/44* (2014.11); *H04N 19/61* (2014.11)

(58) Field of Classification Search
CPC .................................................... H04N 19/103
USPC ....................................... 375/240.01–240.29
See application file for complete search history.

(56) References Cited

U.S. PATENT DOCUMENTS

| | | | | |
|---|---|---|---|---|
| 7,756,202 | B2 * | 7/2010 | Ueda ................ | G11B 20/00007 375/240.08 |
| 2005/0025246 | A1 * | 2/2005 | Holcomb ............. | H04N 19/176 375/240.23 |
| 2007/0217506 | A1 * | 9/2007 | Yang ................ | H04N 19/00781 375/240.03 |
| 2011/0002386 | A1 * | 1/2011 | Zhang ................. | H04N 19/105 375/240.15 |
| 2014/0226721 | A1 * | 8/2014 | Joshi .................... | H04N 19/159 375/240.13 |

* cited by examiner

*Primary Examiner* — Leron Beck
(74) *Attorney, Agent, or Firm* — Young Basile Hanlon & MacFarlane, P.C.

(57) ABSTRACT

A method for decoding an encoded video bitstream includes generating a decoded frame by decoding a current frame from the encoded video bitstream. The decoding of the current frame may include decoding, from the encoded video bitstream, a transform mode for the current frame, identifying the transform mode for a current block of the current frame on a condition that the transform mode for the current frame is a per-block transform mode, using the transform mode for the current frame as the transform mode for the current block on a condition that the transform mode for the current frame is a per-frame transform mode, identifying a prediction mode for the current block, and generating a decoded block for the current block using the prediction mode and the transform mode for the current block.

17 Claims, 8 Drawing Sheets

SELECTION OF TRANSFORM SIZE IN VIDEO CODING

CROSS-REFERENCE TO RELATED APPLICATION(S)

This application is a continuation of U.S. patent application Ser. No. 14/976,438, filed Dec. 21, 2015, which is a divisional of U.S. patent application Ser. No. 13/743,602, filed Jan. 17, 2013, now U.S. Pat. No. 9,219,915.

TECHNICAL FIELD

This disclosure relates to encoding and decoding visual data, such as video stream data, for transmission or storage using intra prediction.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques.

SUMMARY

This application relates to encoding and decoding of video stream data for transmission or storage. Disclosed herein are aspects of systems, methods, and apparatuses related to selection of transform size in video coding.

An aspect is a method for decoding an encoded video bitstream, including generating a decoded frame by decoding a current frame from the encoded video bitstream. The decoding of the current frame may include decoding, from the encoded video bitstream, a transform mode for the current frame, identifying the transform mode for a current block of the current frame on a condition that the transform mode for the current frame is a per-block transform mode, using the transform mode for the current frame as the transform mode for the current block on a condition that the transform mode for the current frame is a per-frame transform mode, identifying a prediction mode for the current block, and generating a decoded block for the current block using the prediction mode and the transform mode for the current block.

Another aspect is apparatus for decoding an encoded video bitstream having a plurality of frames. The apparatus may include a memory, and a processor configured to execute instructions stored in the memory to generate a decoded frame by decoding a current frame from the encoded video bitstream, decode, from the encoded video bitstream, a transform mode for the current frame, identify a transform mode for a current block of the current frame on a condition that the transform mode for the current frame is a per-block transform mode, use the transform mode for the current frame as the transform mode for the current block on a condition that the transform mode for the current frame is a per-frame transform mode, identify a prediction mode for the current block, and generate a decoded block for the current block using the prediction mode and the transform mode for the current block.

Another aspect is a method of is a method for decoding an encoded video bitstream having a plurality of frames. The method may include decoding from the encoded video bitstream, a transform mode for a current frame of the plurality of frames, wherein the transform mode includes one of indicating a default transform size for each block of the frame or indicating a per-block transform mode, identifying a transform size for a current block by inspecting a block header of the current block on a condition that the default transform mode indicates the per-block transform mode, and decoding the current block using the transform size.

Variations in these and other aspects of this disclosure will be described in additional detail hereafter.

BRIEF DESCRIPTION OF THE DRAWINGS

The description herein makes reference to the accompanying drawings wherein like reference numerals refer to like parts throughout the several views unless otherwise noted.

DETAILED DESCRIPTION

Digital video encoding is used for various purposes including, for example, remote business meetings via video conferencing, high definition video entertainment, video advertisements, and sharing of user-generated videos. Encoding can include compressing the video stream to reduce required bandwidth by reducing the amount of data that needs to be included in an encoded bitstream.

As will be discussed in more detail in reference to FIG. 3, digital video streams can include frames divided into blocks. Compressing the video stream can be achieved by, for example, encoding the blocks using prediction. Intra prediction, for example, uses data from blocks peripheral to the current block to generate a prediction block. Only the difference between the prediction block and current block is included in the encoded bitstream for later reconstruction of the current block. Larger blocks can be divided into smaller blocks for purposes of improving the accuracy of prediction. In one implementation, a 16×16 macroblock can be divided into four 8×8 blocks such that each 8×8 block is predicted separately. Aspects of disclosed implementations can divide a larger block, such as a 16×16 or 8×8 macroblock or larger, into a series of 4×4 blocks or smaller that can be combined into rectangular sub-blocks that include all of the pixels of the larger block in one and only one sub-block.

As will be discussed in more detail in reference to FIG. 4, residual blocks of video data (e.g., the differences between the current block and prediction block pixels) can be transformed following prediction using any number of transforms, such as a discrete cosine transform (DCT). Transforms may be available in different sizes, such as 64×64, 32×32, 16×16, 8×8, 4×4 or rectangular combinations of 4×4 blocks. Depending on the input, one transform size or mode may be more efficiently encode residual information than another. For example, when the video source has a high spatial coherence (e.g., high-definition (HD) material), a 16×16 DCT might be highly efficient. On the other hand, for very complicated blocks, a 4×4 transform can be more efficient.

The transform mode can be tied to the intra prediction size of the blocks. Transform block size can be the same size or smaller than the intra prediction block size. Associating transform block size with intra prediction block size has the benefits of simpler coding schemes and no overhead for signaling transform block size. It can be beneficial in some cases to allow variable transform sizes. In these cases the transform block size can be signaled on a per-segment, per-frame or per-block level. Signaling at the per-block level as opposed to the per-segment or per-frame level, while potentially increasing the accuracy of the coding, can introduce additional bits into the bitstream. For example, for a two-segment frame, the background segment can enforce coupling transform size with prediction size, while the foreground segment can specify selection of transform size on a per-block basis. Choosing an optimal approach by attempting every combination can be computationally unfeasible.

According to techniques described herein, specifying the transform block size can be indicated without adding significant computational overhead and without adding a significant number of bits to the bitstream. Aspects of disclosed implementations can accomplish this by indicating a default transform mode in a frame header and then estimating the distortion of transform modes other than the default transform mode. If an estimated transform mode incurs less distortion than the default transform mode, the default transform mode can be updated following encoding the frame for use by subsequent frames. In this fashion the default transformation mode can converge to an optimal state after encoding a small number of frames. Details of certain implementations of the teachings herein are described after first discussing environments in which aspects of this disclosure may be implemented.

Figure 1:
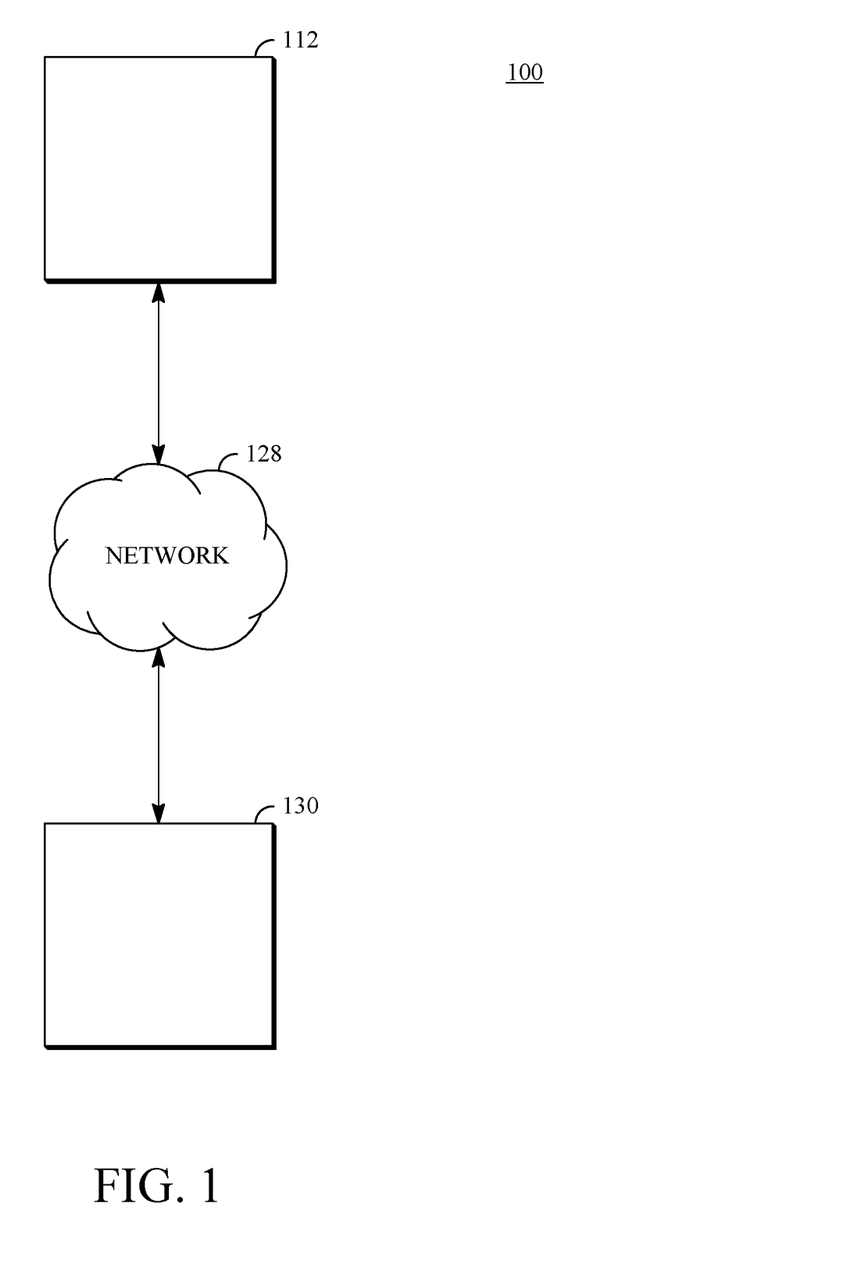
FIG. 1 is a schematic of a video encoding and decoding system.

FIG. 1 is a schematic of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 described herein can be distributed among multiple devices.

A network 128 can connect transmitting station 112 and a receiving station 130 for encoding and subsequent decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
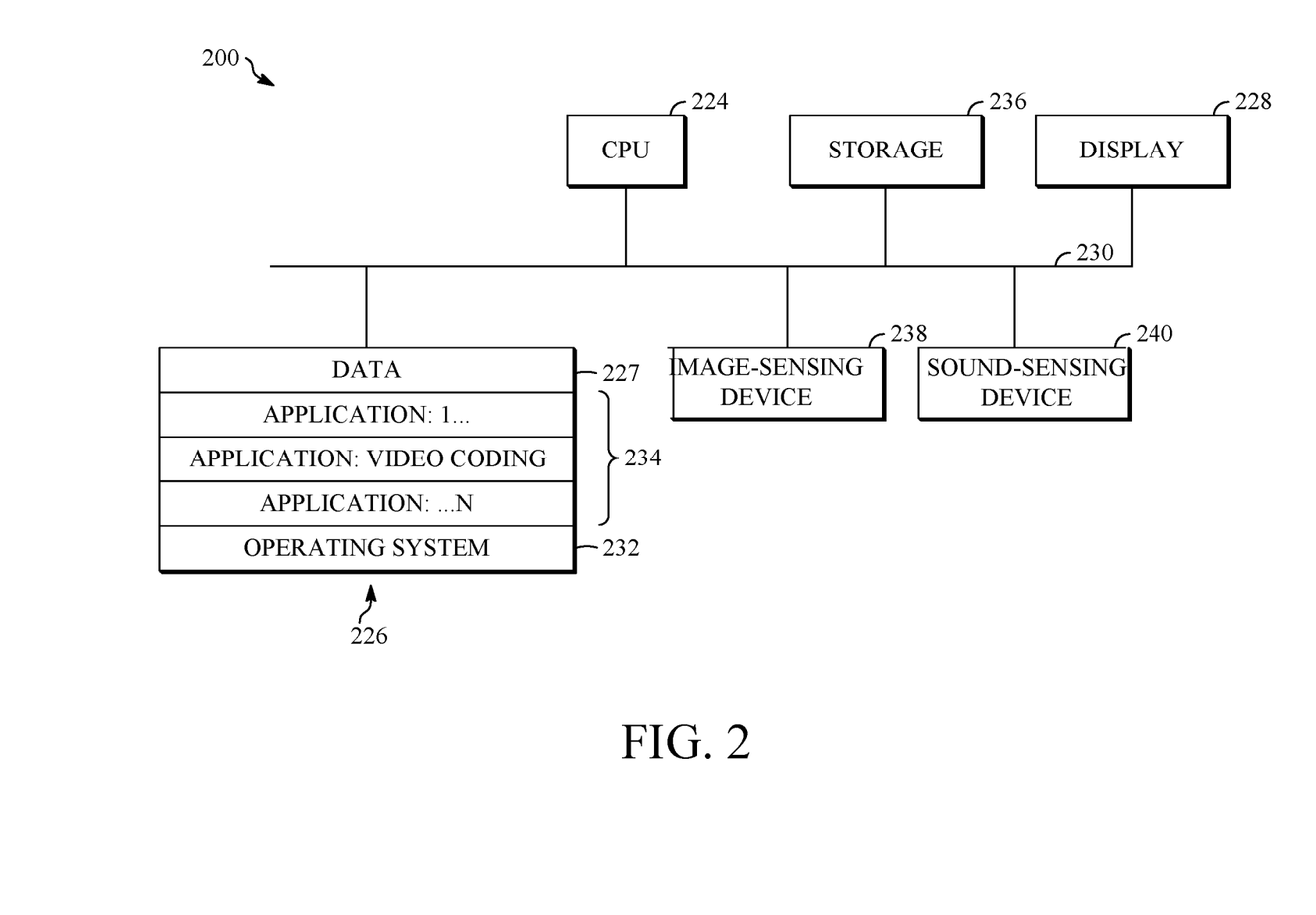
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the implementations described herein can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video encoding application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228.

When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
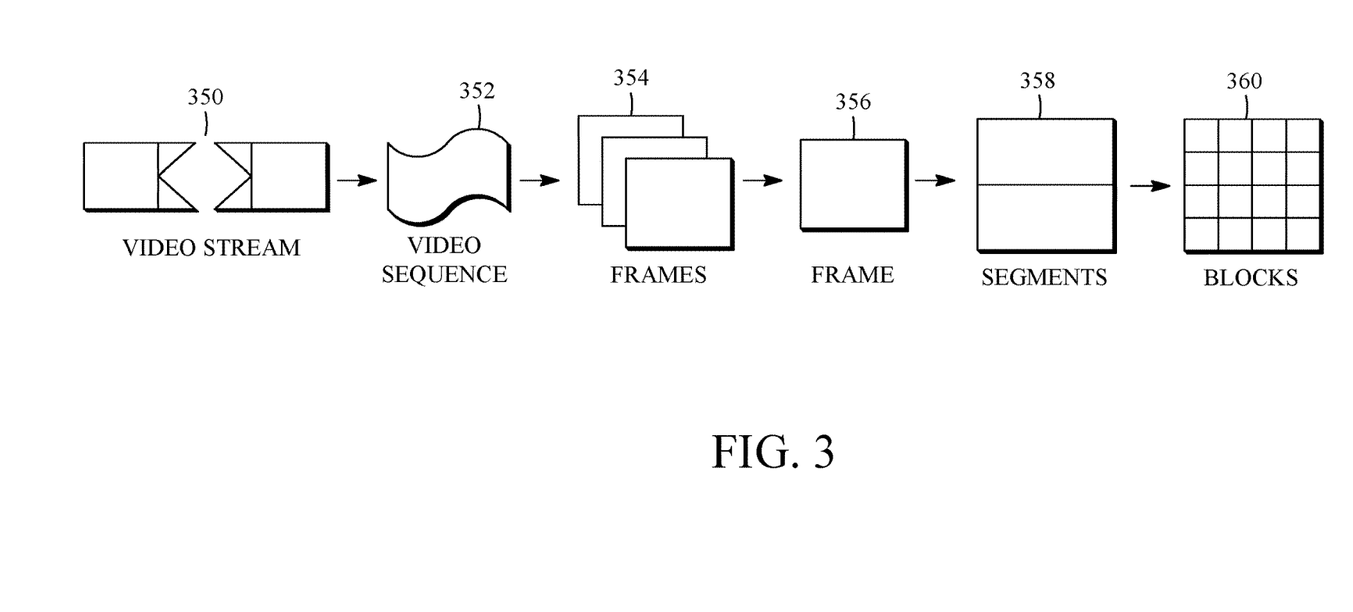
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames. Adjacent frames 354 can then be further subdivided into individual frames, e.g., a single frame 356. At the next level, a single frame 356 can be divided into a series of segments or planes 358. Segments or planes 358 can be subsets of frames that permit parallel processing, for example. Segments or planes 358 can be subsets of frames that can separate the video data in a frame into separate colors. For example, a frame of color video data can include a luminance plane and two chrominance planes. Segments or planes 358 may be sampled at different resolutions.

Segments or planes 358 can include blocks 360, which may contain data corresponding to, for example, macroblocks of 16×16 or 32×32 pixels in frame 356. Blocks 360 can also be of any other suitable size such as 4×4, 8×8, 16×8 or 8×16 pixels. Blocks 360 can, for example, include pixel data from a luminance plane and two chrominance planes. Unless otherwise noted, the terms block and macroblock are used interchangeably herein.

Figure 4:
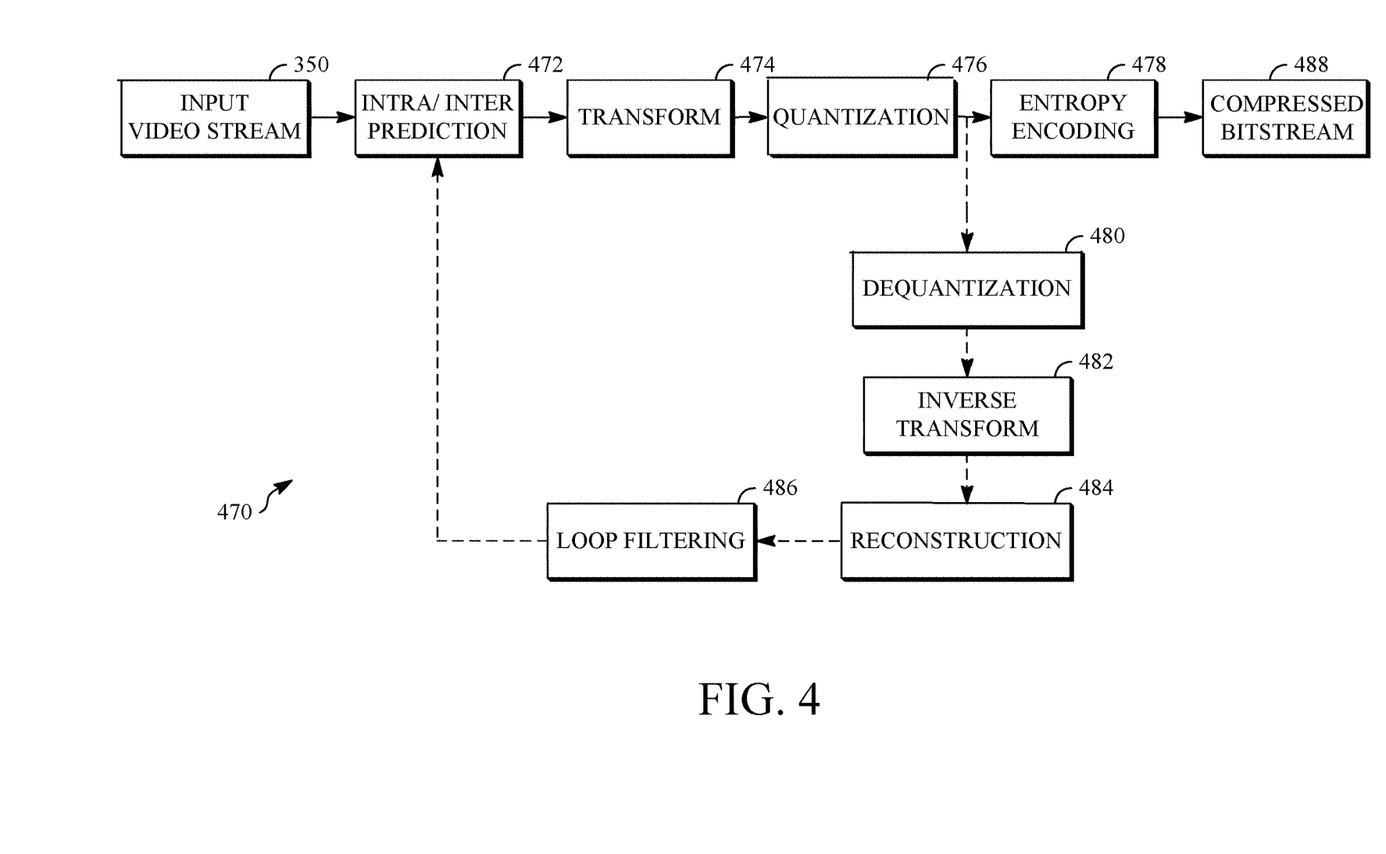
FIG. 4 is a block diagram of a video compression system in accordance with an implementation of the teachings herein.

FIG. 4 is a block diagram of an encoder 470 in accordance with an implementation. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 3, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 including planes or segments 358 within the video stream 350 can be processed in units of blocks 360. At the intra/inter prediction stage 472, each block can be encoded using intra-frame prediction (also called intra prediction herein) or inter-frame prediction (also called inter prediction herein). In the case of intra-prediction, a prediction block can be formed from samples in the current frame that have been previously encoded and reconstructed. In the case of inter-prediction, a prediction block can be formed from samples in one or more previously encoded and reconstructed reference frames.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), Asymmetrical Discrete Cosine Transform (ADST) and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to compressed bitstream 488. Compressed bitstream 488 can be formatted using various techniques, such as variable length coding (VLC) or arithmetic coding. Compressed bitstream 488 can also be referred to as an encoded video bitstream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
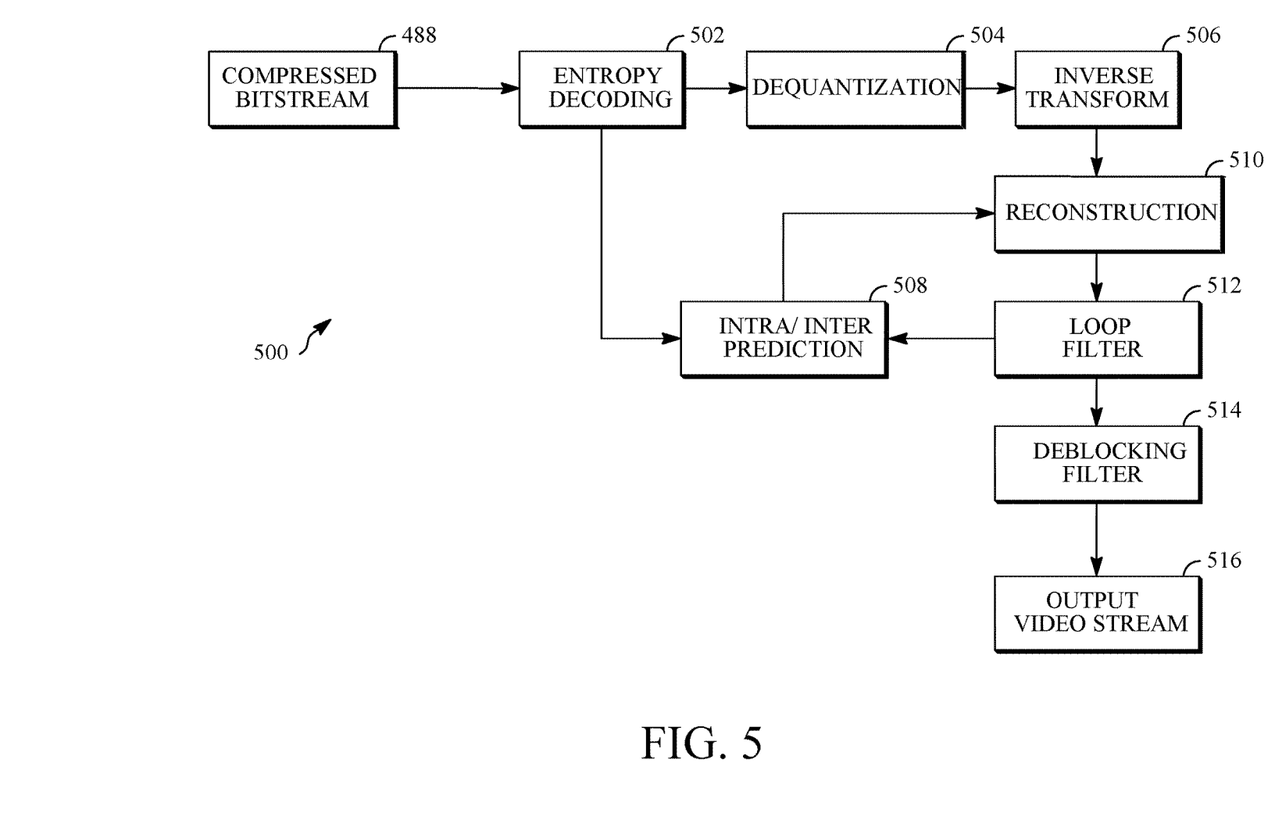
FIG. 5 is a block diagram of a video decompression system in accordance with another implementation in accordance with the teachings herein.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. For example, deblocking filtering stage 514 can be applied to the reconstructed block to reduce blocking distortion, and the result is output as output video stream 516. Output video stream 516 can also be referred to as a decoded video stream and the terms will be used interchangeably herein.

Other variations of decoder 500 can be used to decode compressed bitstream 488. For example, decoder 500 can produce output video stream 516 without deblocking filtering stage 514.

As described briefly above, aspects of disclosed implementations can signal transform size on a per-segment, per-frame or per-block level according to the teachings herein. According to the examples provided herein, the signaling taught herein allows a 4×4, 8×8 or 16×16 or other rectangular transform to be signaled on a per-segment, per-block level or per-frame level without testing every combination of transform size and intra prediction block size. This can be accomplished by, firstly, limiting the transform size to the same size or smaller than the block size used in prediction. Then, while processing the block in a rate distortion loop, in addition to calculating the rate distortion for the block using the default transform size, rate distortion values can be estimated for additional transform sizes. Following the rate distortion loop the estimated rate distortion values can be compared to the calculated rate distortion value and in cases where the estimated value is less than the calculated value the default transform mode can be updated for use in encoding subsequent frames.

Transform mode can indicate either a maximum transform size, such as 16×16, 8×8 or 4×4, or a per-block transform size, where the transform size is determined for each block individually and indicated in a block header associated with the block. In this latter case, several steps incorporated in a rate distortion loop can be used to choose which transform size, and hence transform mode, to include for each block. In the rate distortion loop, the encoder loops through the blocks of a frame and estimates the distortion, or the magnitude of the residual values left following prediction, transformation and quantization for various combinations of intra prediction block sizes and transform sizes, and the rate, or the number of additional bits required in the encoded bitstream to indicate the prediction mode and transform size. Based on this calculation, a transform mode can be chosen.

Figure 6:
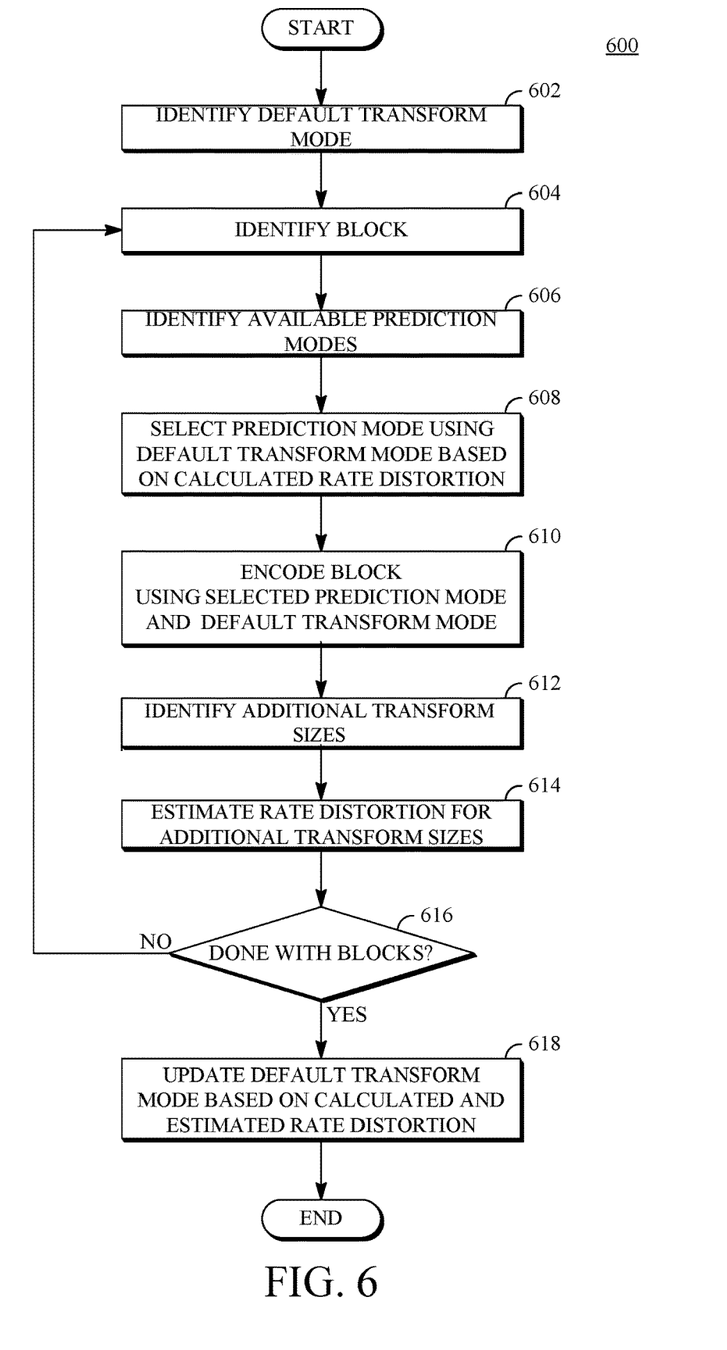
FIG. 6 is a flowchart of a process for encoding of a video stream using selectable transform sizes according to an aspect of the teachings herein.

FIG. 6 is a flowchart of a process 600 for encoding a video stream using selectable transform sizes according to an aspect of the teachings herein. Process 600 can be implemented in a system, such as system 470, to encode a video stream. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Process 600 represents portions of a rate distortion loop. A rate distortion loop is part of a technique for encoding a frame of a video stream. At step 602, a default transform mode for a frame of video data to be encoded is identified. Identified means determined, calculated, discovered, chosen or otherwise identified in any manner whatsoever. The default transform mode can be one of several choices of a maximum transform size for the frame or segment as a whole or can be a mode that selects the transform size at a per-block level. As discussed below, the transform mode can be a maximum size, such as 4×4, 8×8 or 16×16, or the transform mode can specify that a transform size should be identified for each block of the frame independently. This latter transform mode is called a per-block transform mode herein. In the implementations described herein, larger transforms may not be used with smaller prediction modes when operating in the per-block transform mode. For example, a 16×16 transform may not be used with an 8×8 prediction block used for intra prediction since results of encoding and decoding some of the first 8×8 blocks can be used to encode subsequent 8×8 blocks. A user may specify the default transform mode at an initial value in some implementations.

At step 604, the rate distortion loop is started by identifying for processing a block of the frame. Blocks of the frame can be identified for processing in raster scan order, in which the blocks of a frame are identified starting at the upper left corner of the frame and then proceeding along rows of blocks from the top of the frame to the bottom. In one technique of performing a rate distortion loop, a rate distortion multiplier (sometimes referred to as lambda) is used to specify the weight of rate versus distortion, that is, by how much should the distortion (residual signal) decrease to be worth adding a number of bits (e.g., rate) to the compressed bitstream. The loop iterates over multiple available modes, e.g., various intra and inter prediction modes, calculates the cost in bits for coding the block in that way (including the mode and transform coefficients), then calculates the rate (i.e., how many additional bits would coding the block using the mode cost), and then generates the rate/distortion result (also called a rate distortion value herein). Then, the loop selects the mode with the best rate/distortion result. For speed reasons, the loop often applies thresholds to each coding mode so that coding modes are not tested that are not likely to improve the rate/distortion result significantly, and the loop keeps track of mode counts so that the loop will not keep trying the same mode over time if that particular mode is not used.

More generally, at step 606, process 600 identifies which prediction modes are available for processing the current block. For example, process 600 can identify whether to use intra or inter prediction for the current block. This identification also includes the available prediction block sizes. When the default transform mode is a particular size, for example, the available prediction modes can be limited to those prediction modes using block sizes smaller than or equal to the particular transform size. The available prediction block sizes can also be limited to, for example, system defaults where the default transform mode is the per-block transform mode. The available prediction modes for a current block can also be limited based on thresholds and mode counts described above.

At next step 608, process 600 selects the intra prediction mode to use in encoding the block. The prediction mode is selected by encoding the block using each available prediction mode identified in step 606 and comparing the resulting rate distortion values in the looping process described above. The prediction mode can include dividing the block into sub-blocks and encoding the sub-blocks. In such a case, the rate distortion values for the sub-blocks can be summed to determine an overall rate distortion value for the block. The rate distortion value is calculated for each block using the default transform mode. As discussed above, one of the available transform modes can include a per-block transform mode. When the default transform mode is the per-block transform mode, the transform size is determined for each block of the frame independently. Step 608 thus tests the available transform sizes (e.g., those the same size or smaller than the prediction block size) and selects the transform size yielding the best rate distortion value.

At step 610, the block (including any sub-blocks) may be encoded using the selected prediction mode and the default transformation mode. Note that although process 600 is described as processing for one block at a time through steps 604-616, the processing of steps 604-610 could occur for all blocks of the frame in the scan order, and then the processing of steps 612 and 614 could occur for all blocks of the frame in the scan order after step 610 is completed for the last block of the frame.

Making all available choices of transform size available to all blocks of the frame (as opposed to using a default size or a transform size based on the prediction block size) could increase the number of possible choices in step 608 exponentially (i.e., every possible intra/inter mode in combination with every transform mode). To prevent this, additional steps to the rate distortion loop test additional transform sizes by estimating the rate distortion value for the different sizes instead of calculating the actual rate distortion values. Estimation differs from calculation in at least two ways. First, the predicted blocks depend upon previously encoded and decoded blocks to calculate a prediction block. To calculate precisely the rate distortion value for a given transform size the previously encoded and decoded blocks are encoded and decoded using the transform size being tested. Estimating the rate distortion value for a transform size instead uses the results of encoding and decoding the previously processed blocks using the default transform size, thereby reducing computation load. Second, encoding the block data can be stopped following transformation rather than proceeding to quantization. The rate distortion value can be estimated using the partially encoded transform results.

Specifically, process 600 identifies additional transform sizes for a block at step 612. For example, if the default transform mode were a per-frame transform size of 16×16, 8×8 or 4×4, the two transform sizes not used in step 608 are identified in step 612. If the per-block transform mode was indicated, process 600 would have already tested at least one transform size (and possibly more) and saved the rate distortion results for analysis following the rate distortion loop at step 610. The remaining transform sizes as specified by the frame-wide transform modes are then identified in step 612.

Associating a default transform mode for an entire frame can have the benefit of specifying a transform size without requiring that the transform size be specified on a per-block basis, thereby saving bits in the encoded bitstream. If it is determined, for example by performing a rate distortion loop, that per-block transform size identification would save more bits than would be added by specifying the transform size, per-block transform size mode can be specified in the frame header. At low bitrates, some video streams can experience an increase in bitrates by indicating the transform size at the per-block level, as the increased cost in bits in the block headers can outweigh the savings in bits due to greater compression ratios achieved.

This teaching can be applied at step 614 by estimating the rate distortion values for the current block using the additional transform sizes. As discussed above, the rate distortion value is estimated rather than calculated to reduce the computation required. In some embodiments, step 614 can include applying transforms to the residual based on the each additional transform size. A measure of the magnitude of the transformed residual block can be made that is related to the final encoded size of the block and can be taken as an estimate of the distortion. The total bit count for the bits required to specify the transform size on a per-block level, where applicable, can be applied to the estimate of the rate. Basically, applying the transform to the previously-generated residual can be used to generate a difference (either positive or negative) to the calculated rate distortion value of step 608.

At step 616, process 600 queries as to whether any more blocks of the frame require processing and either loops back to step 604 to identify another block of the frame for processing or exits the loop. Since step 614 provides information as to how the rate would change given another frame-level setting for transform size, alternative best rate distortion results that cover the hypothetical case of choosing a different transform size setting could be kept. Thus, at the end of the rate distortion loop at 618, a rate distortion result that is the optimal coding mode for the current block given the current transform size setting, as well as a set of alternative rate distortion results that cover cases where alternative transform size settings were to be used, which may be either better or worse than the actual rate distortion result, are provided. By doing this for a block of the whole current frame, the values can be summed to determine which transform size settings would have led to the best coding for the frame, regardless of the actual default transform mode. For example, while iterating through the loop for each block, cumulative rate distortion results by transform mode may be maintained in step 614. For the next frame, if the current setting were not optimal, these results could be used to choose another setting as the default transform mode for the next frame in step 618. The setting chosen is generally that resulting in the lowest cumulative rate distortion result for the entire current frame.

In some cases, if it proves to be sufficiently beneficial (e.g., the process is not time constrained and the bit savings is high), it may be worth changing the transform mode and re-doing the rate distortion loop for the current frame using the new setting.

Figure 8:
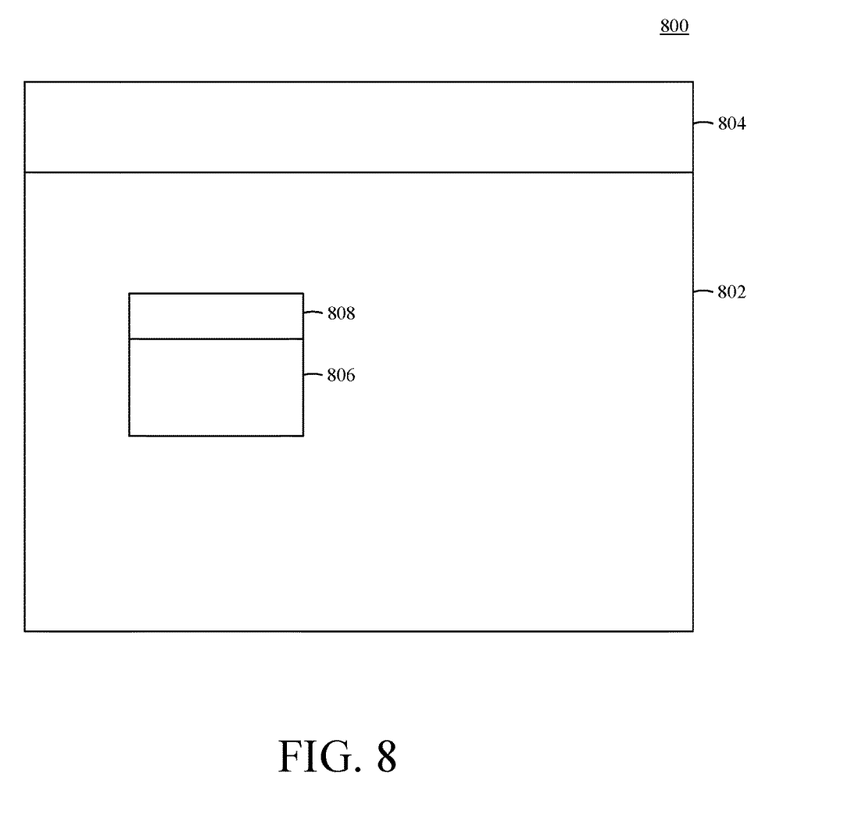
FIG. 8 is a diagram showing a frame header and a block header.

The encoded blocks, along with the default transform mode and per-block transform sizes, where appropriate, are subsequently encoded in the video bitstream. For example, FIG. 8 is a diagram showing a frame 802 of a video stream 800 having a frame header 804. Frame 802 includes one or more blocks 806 having block headers 808. Bits indicating the default transformation mode may be included in frame header 804. In cases where the default transformation mode is the per-block transform mode, bits indicating which size transform to use may be included in a block header 808 associated with a respective block 806.

Using the techniques described herein, the complexity of choosing an optimal transform mode for frames becomes an integral part of the rate distortion loop to converge to an optimal result within a small number of frames. Associating a default transform mode for an entire frame can have the benefit of specifying a transform size without requiring that the transform size be specified on a per-block basis, thereby saving bits in the encoded bitstream. If it is determined, for example by performing the rate distortion loop, that per-block transform size identification would save more bits than would be added by specifying the transform size, per-block transform size mode can be specified in the frame header. At low bitrates, some video streams can experience an increase in bitrates by indicating the transform size at the per-block level, as the increased cost in bits in the block headers can outweigh the savings in bits due to greater compression ratios achieved. Accordingly, low bitrate streams are likely to choose a single transform size at the frame-level, whereas medium-or-high bitrate streams may significantly benefit from signaling the transform size per block. The techniques taught herein also allow adjustment during the processing of the video stream to take advantage of changes in the captured images that may result in desirable changes to the transform mode.

In order to reduce computational requirements, rate distortion changes for the additional transform sizes do not have to be estimated for each block of each frame. For example, rate distortion changes could be estimated for the additional transform sizes every $n^{th}$ block. N may be a number between 1 and 100 in an implementation. In this way, the transform mode can be updated for each frame without requiring that rate distortion changes be estimated for each additional transform size for each block. In addition, the default transform mode does not have to be updated for each frame. Aspects of disclosed implementations can estimate the rate distortion for additional transform sizes every $m^{th}$ frame, where m is a number between 1 and 100, for example. Using either or both of these approaches can further reduce computational requirements and thereby speed up the encoding process while still permitting the transform mode to be updated and converge to an optimal result.

Figure 7:
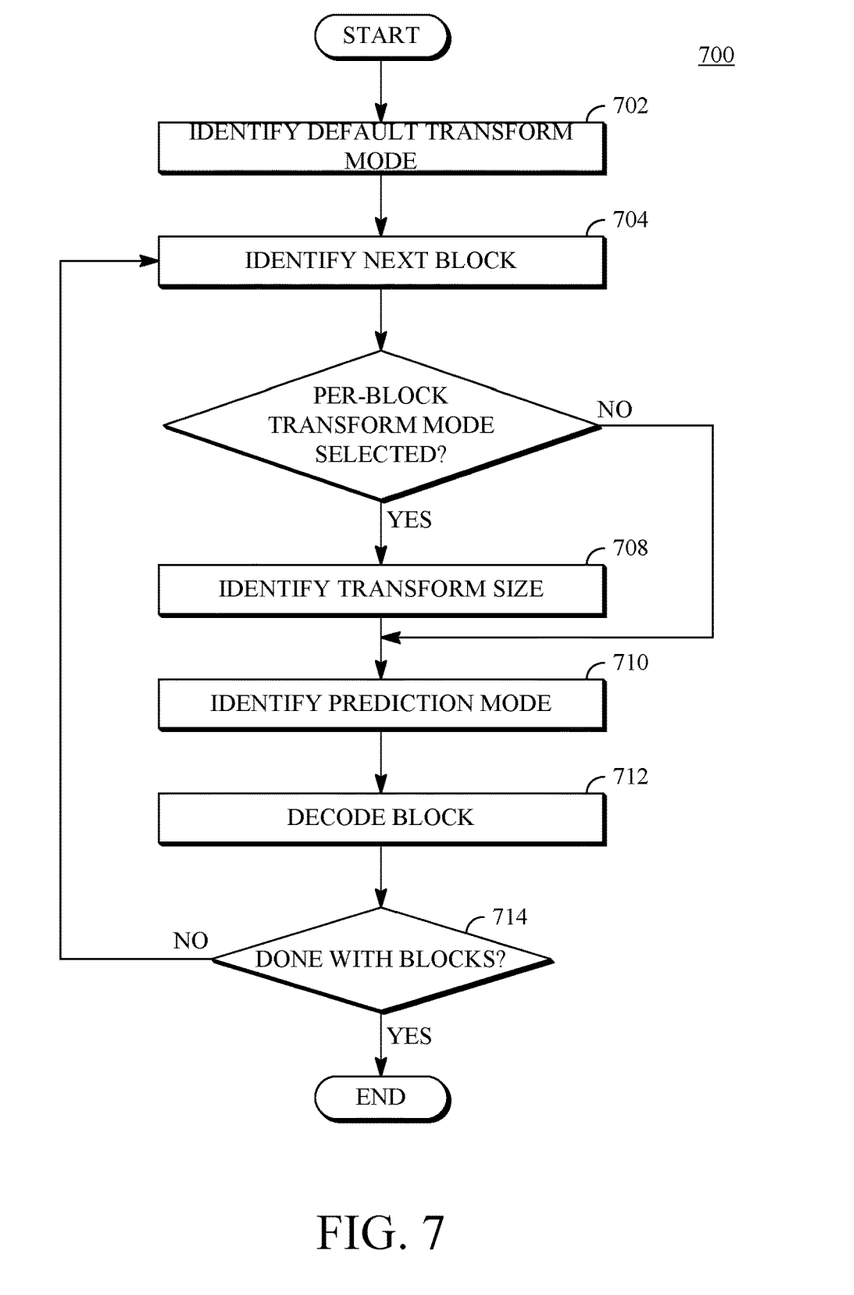
FIG. 7 is a flowchart of a process for decoding of a video bitstream using selectable transform sizes according to an aspect of the teachings herein.

FIG. 7 is a flowchart of a process 700 for decoding a video bitstream using variable sized transforms according to an aspect of the teachings herein. Process 700 can be implemented in a system such as system 500 to decode a video bitstream. Process 700 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 700. Process 700 can also be implemented using hardware in whole or in part. As explained above, some computing devices may have multiple memories and multiple processors, and the steps of process 700 may in such cases be distributed using different processors and memories.

For simplicity of explanation, process 700 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 702, process 700 begins decoding an encoded video bitstream by first identifying the default transform mode. The default transform mode can be indicated by bits included in a frame header associated with the current frame of the encoded video bitstream. In one implementation, the default transform mode can either specify a default transform size, such as 4×4, 8×8 or 16×16, or can specify that transform sizes are included in block headers received by the decoder with the blocks of the frame (e.g., the per-block transform mode).

At step 704, process 700 begins a loop wherein the blocks of the frame are processed by first identifying a current block of the frame for processing in scan order. Blocks may be identified for processing starting at the upper left hand corner of the frame and continuing in raster scan order until the blocks of the frame have been processed. At step 706, if the default transform mode identified at step 702 is the per-block transform mode, process 700 passes to step 708, where the block header is inspected to identify which transform size will be used to inverse transform the block being decoded. If the default transform mode is not the per-block transform mode, process 700 uses the per-frame transform size associated with the default transform mode identified in step 702.

Regardless of the transform mode, at next step 710, the block header is inspected to identify the prediction mode to be used to decode the block. Then, the current block is decoded using the identified prediction mode and the transform size at step 712. Following this, process 700 checks to see if any blocks of the frame remain to be processed at step 714, and if so, returns to step 704 to identify the next block to be decoded. Otherwise, process 700 exits.

Forcing one transform size can greatly improve or hurt quality depending on the video. The teachings herein allow transform size to be variable without unconditionally imposing such a setting. The default transform mode indicator included in the frame header can be used to either indicate a transform size to be used for the blocks of a frame or to indicate that per-block transform size is to be used. Cases where a single transform size is advantageous may include cases where the video data stream includes generally homogeneous data that changes slowly, e.g., the encoded bitstream has a relatively low bitrate. Cases where per-block transform size is advantageous may include cases where the video data stream includes quickly moving objects and the scene is changing rapidly, leading to a high bitrate data stream, for example. In this latter case, the extra bits associated with indicating a per-block transform size are a much smaller percentage of the video bitstream data. According to the teachings herein, a near-optimal transform size prediction flag setting for given encode/bitrate settings can be selected without having to test each individual transform size setting individually.

Implementations of the teachings herein gains most of the advantages of allowing for variable transform sizes, yet hardly increases decoder complexity. Further, the encoder can choose to set one flag unconditionally if speed is necessary. In alternative implementations, signaling regarding transform mode and/or size can be done at a per-superblock, per segment, etc., level as opposed to or in addition to at the per-frame and per-block level.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding an encoded video bitstream, the method comprising:
   generating, by a processor in response to instructions stored on a non-transitory computer readable medium, a decoded frame by decoding a current frame from the encoded video bitstream, wherein decoding the current frame includes:
      decoding, from the encoded video bitstream, a first value for decoding the current frame;
      in response to a determination that the first value indicates the use of per-block transform signaling, identifying, based on information other than the first value, a transform for decoding a current block of the current frame;
      in response to a determination that the first value indicates the use of per-frame transform signaling, using the first value as an identifier of the transform;
      identifying a prediction mode for the current block; and
      generating a decoded block for the current block using the prediction mode and the transform.

2. The method of claim 1, wherein the first value is identified by inspecting bits included in a frame header of the current frame.

3. The method of claim 1, further comprising:
   identifying an updated transform for a subsequent frame relative to the current frame, the updated transform based on the first value, calculated rate distortion values, and estimated rate distortion values.

4. The method of claim 1, wherein identifying the transform includes:
   identifying a transform size of the transform by inspecting block headers for the current block.

5. The method of claim 1, wherein the prediction mode is one of a plurality of prediction modes using block sizes equal to or smaller than a block size of the transform.

6. The method of claim 1, wherein the first value includes an indication of a maximum transform size for each block of the current frame.

7. The method of claim 1, wherein identifying the transform includes identifying an indication of a transform size being one of 16×16, 8×8, or 4×4.

8. An apparatus for decoding an encoded video bitstream having a plurality of frames, the apparatus comprising:
   a memory; and
   a processor configured to execute instructions stored in the memory to:
      decode, from the encoded video bitstream, a first value for decoding a current frame from the encoded video bitstream;
      in response to a determination that the first value indicates the use of per-block transform signaling, identify, based on information other than the first value, a transform for decoding a current block of the current frame;
      in response to a determination that the first value indicates the use of per-frame transform signaling, use the first value as an identifier of the transform;
      identify a prediction mode for the current block; and
      generate a decoded block for the current block using the prediction mode and the transform.

9. The apparatus of claim 8, wherein the processor is configured to execute instructions stored in the memory to:
   identify the first value by inspecting bits included in a frame header of the current frame.

10. The apparatus of claim 8, wherein the processor is configured to execute instructions stored in the memory to:
    identify an updated transform for a subsequent frame relative to the current frame, the updated transform based on the first value, calculated rate distortion values, and estimated rate distortion values.

11. The apparatus of claim 8, wherein the processor is configured to execute instructions stored in the memory to:
    identify a transform size of the transform for each block in the frame by inspecting respective block headers in response to the determination that the first value indicates the use of per-block transform signaling.

12. The apparatus of claim 8, wherein the prediction mode is one of a plurality of prediction modes using block sizes equal to or smaller than a block size of the transform.

13. The apparatus of claim 8, wherein the first value includes an indication of a maximum transform size for all blocks of the current frame.

14. A method for decoding an encoded video bitstream having a plurality of frames, the method comprising:
    generating, by a processor in response to instructions stored on a non-transitory computer readable medium, a decoded frame by decoding a current frame from the encoded video bitstream, wherein decoding the current frame includes:
       decoding, from the encoded video bitstream, a transform mode signaling type identifier for the current frame, wherein the transform mode signaling type identifier indicates the use of per-frame transform mode signaling and identifies a transform size, or the transform mode signaling type identifier indicates the use of per-block transform mode signaling and omits the transform size;
       in response to a determination that the transform mode signaling type identifier indicates the use of per-block transform mode signaling, identifying the transform size by inspecting a block header of a current block; and
       decoding the current block using a transform having the transform size.

15. The method of claim 14, wherein the transform mode signaling type identifier for the current frame is identified by inspecting bits included in a frame header of the current frame.

16. The method of claim 14, wherein on a condition that the transform signaling type identifier indicates the transform size, the transform size represents a maximum transform size for each block of the current frame.

17. The method of claim 14, wherein the transform mode signaling type identifier indicates a 16×16 transform size, a 8×8 transform size, or a 4×4 transform size.

* * * * *